(12) United States Patent
Hong

(10) Patent No.: US 12,557,100 B2
(45) Date of Patent: Feb. 17, 2026

(54) DATA TRANSMISSION METHOD AND APPARATUS, AND STORAGE MEDIUM

(71) Applicant: Beijing Xiaomi Mobile Software Co., Ltd., Beijing (CN)

(72) Inventor: Wei Hong, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 477 days.

(21) Appl. No.: 17/997,993

(22) PCT Filed: May 6, 2020

(86) PCT No.: PCT/CN2020/088831
§ 371 (c)(1),
(2) Date: Nov. 4, 2022

(87) PCT Pub. No.: WO2021/223119
PCT Pub. Date: Nov. 11, 2021

(65) Prior Publication Data
US 2023/0180233 A1  Jun. 8, 2023

(51) Int. Cl.
*H04W 72/1273* (2023.01)
*H04W 72/23* (2023.01)

(52) U.S. Cl.
CPC ....... *H04W 72/1273* (2013.01); *H04W 72/23* (2023.01)

(58) Field of Classification Search
CPC ............. H04W 72/30; H04W 72/1273; H04W 72/23
See application file for complete search history.

(56) References Cited

U.S. PATENT DOCUMENTS

| 10,470,169 B2 | 11/2019 | Jiang |
| 2013/0028235 A1 | 1/2013 | Barrett |
| 2015/0349902 A1* | 12/2015 | Moulsley ............. H04B 7/0413 370/252 |
| 2018/0206227 A1 | 7/2018 | Jiang |
| 2018/0270699 A1 | 9/2018 | Babaei et al. |
| 2018/0270853 A1* | 9/2018 | Hosseini ............... H04W 76/11 |

(Continued)

FOREIGN PATENT DOCUMENTS

| CN | 103733659 A | 4/2014 |
| CN | 106714315 A | 5/2017 |

(Continued)

OTHER PUBLICATIONS

International Search Report Issued Jan. 25, 2021, in PCT/CN2020/088831, filed on May 6, 2020, 4 pages.

(Continued)

*Primary Examiner* — Andrew Lee
(74) *Attorney, Agent, or Firm* — Oblon, McClelland, Maier & Neustadt, L.L.P.

(57) ABSTRACT

The data transmission method can include broadcasting a downlink control indication to one or more terminals in a target state, where the downlink control indication includes a first indicator, information in the first indicator indicating presence of downlink data scheduling information for a terminal, and the target state includes an idle state or an inactive state, and broadcasting downlink data associated with the downlink data scheduling information.

13 Claims, 13 Drawing Sheets

(56) References Cited

U.S. PATENT DOCUMENTS

| | | | |
|---|---|---|---|
| 2018/0270859 A1* | 9/2018 | Fan | H04L 5/0053 |
| 2018/0352564 A1 | 12/2018 | Ye et al. | |
| 2019/0349902 A1* | 11/2019 | Soriaga | H04W 72/23 |
| 2020/0229265 A1* | 7/2020 | Wang | H04W 24/08 |
| 2020/0322918 A1* | 10/2020 | Shih | H04W 76/11 |
| 2021/0105808 A1* | 4/2021 | Lei | H04L 5/0051 |
| 2021/0194734 A1* | 6/2021 | Herath | H04W 56/0005 |
| 2021/0314912 A1* | 10/2021 | He | H04W 52/0216 |
| 2022/0174723 A1* | 6/2022 | Wei | H04W 74/0833 |
| 2023/0043139 A1* | 2/2023 | Hwang | H04W 52/0229 |
| 2023/0189103 A1* | 6/2023 | Zhang | H04W 36/06 |
| 2023/0284289 A1* | 9/2023 | Watts | H04W 76/19 370/329 |
| 2023/0319892 A1* | 10/2023 | Zheng | H04L 5/0053 370/329 |

FOREIGN PATENT DOCUMENTS

| | | |
|---|---|---|
| CN | 108463000 A | 8/2018 |
| CN | 109565686 A | 4/2019 |
| CN | 109644475 A | 4/2019 |
| WO | WO 2018027938 A1 | 2/2018 |

OTHER PUBLICATIONS

OPPO "Discussion on Data transmission in "Inactive" State", 3GPP TSG-RAN WG2 Meeting #96, R2-167479, Reno, USA, Nov. 14-18, 2016, Nov. 4, 2016, 5 pages.

Combined Chinese Office Action & Search Report issued Sep. 9, 2022 in Chinese Application 2020800008897, (with unedited computer-generated English translation of Office Action only), 14 pages.

Written Opinion issued Jan. 25, 2021 in PCT/CN2020/088831, (with English translation), 6 pages.

ZTE, "Remaining issues on transmission in preconfigured UL resources for eMTC", R1-2000369, 3GPP TSG RAN WG1 Meeting #100, e-Meeting, Feb. 24-Mar. 6, 2020, 6 pages.

Shen, X. et al, "5G Random Access Technology Enhancements", China Academy of Information and Communications Technology, Beijing 100191, China, 44(4), 2020, pp. 7-11 (with English Abstract).

* cited by examiner

DATA TRANSMISSION METHOD AND APPARATUS, AND STORAGE MEDIUM

CROSS REFERENCE TO RELATED APPLICATIONS

The present application is the U.S. national phase of PCT Application No. PCT/CN2020/088831 filed on May 6, 2020, which is incorporated herein by reference in its entirety.

BACKGROUND OF THE INVENTION

Field of the Invention

The present disclosure relates to the communication field, and in particular, to data transmission methods and apparatuses, and storage media.

Description of the Related Art

Currently, NR (New Radio) supports three RRC (Radio Resource Control) states, that is, idle, inactive and connected states. For a terminal without frequent data transmission, a network usually keeps the terminal being in the inactive state.

In a Rel-16 (Release 16) phase, the inactive state does not support data transmission. Therefore, a terminal in the inactive state has to enter the connected state if it wants to send or receive data, no matter how small the packet to be transmitted by the terminal or how infrequent the data to be transmitted by the terminal is. Similarly, a terminal in the idle state has to be in the connected state in order to send or receive data.

SUMMARY OF THE INVENTION

To alleviate the problems in the related arts, embodiments of the present disclosure provide data transmission methods and apparatuses, and storage media.

According to a first aspect of the present disclosure, there is provided a data transmission method, including broadcasting a downlink control indication to one or more terminals in a target state, the downlink control indication comprising a first indicator, information in the first indicator indicating presence of downlink data scheduling information for a target terminal, the target state comprising an idle state or an inactive state, and broadcasting downlink data associated with the downlink data scheduling information.

According to a second aspect of the present disclosure, there is provided a method of data transmission at a terminal, including receiving, in a target state, a downlink control indication broadcast by a base station, the target state comprising an idle state or an inactive state, and receiving downlink data associated with downlink data scheduling information broadcast by the base station in response to determining that the downlink control indication comprises a first indicator and information in the first indicator is configured to indicate presence of the downlink data scheduling information for a target terminal.

According to a third aspect of the present disclosure, there is provided a non-transitory computer-readable storage medium, the storage medium storing a computer program, the computer program being used to perform the data transmission method described in any of the first aspects above.

According to a fourth aspect of the present disclosure, there is provided a non-transitory computer-readable storage medium, the storage medium storing a computer program, the computer program being used to perform the data transmission method at a terminal described in any of the second aspects above.

According to a fifth aspect of the present disclosure, there is provided a base station, including one or more processors and a memory for storing instructions executable by the one or more processors. The one or more processors being configured to broadcast a downlink control indication to one or more terminals in a target state, the downlink control indication comprising a first indicator indicating presence of downlink data scheduling information for a terminal, the target state comprising an idle state or an inactive state, and broadcast downlink data associated with the downlink data scheduling information.

According to a sixth aspect of the present disclosure, there is provided a terminal, including one or more processors and a memory for storing instructions executable by the one or more processors. The one or more processors being configured to receive, in a target state, a downlink control indication broadcast by a base station, the target state comprising an idle state or an inactive state, and receive downlink data associated with downlink data scheduling information broadcast by the base station in response to determining that the downlink control indication comprises a first indicator and information in the first indicator is configured to indicate presence of the downlink data scheduling information for a target terminal.

It should be understood that the above general description and the later detailed description are only exemplary and explanatory and do not limit the present disclosure.

BRIEF DESCRIPTION OF THE DRAWINGS

The accompanying drawings, which are incorporated in and constitute a part of this specification, illustrate examples consistent with the present disclosure and, together with the description, serve to explain the principles of the present disclosure.

DETAILED DESCRIPTION OF THE PREFERRED EMBODIMENTS

Figure 1:
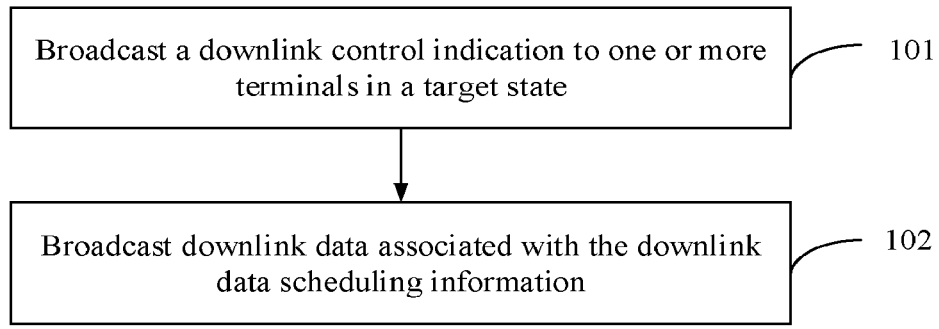
FIG. 1 is a flowchart illustrating a data transmission method according to an embodiment.

Examples will be described in detail herein, with the illustrations thereof represented in the drawings. When the following descriptions involve the drawings, like numerals in different drawings refer to like or similar elements unless otherwise indicated. The embodiments described in the following examples do not represent all embodiments consistent with the present disclosure. Rather, they are merely examples of apparatuses and methods consistent with some aspects of the present disclosure as detailed in the appended claims.

The terms used in the present disclosure are for the purpose of describing particular examples only, and are not intended to limit the present disclosure. Terms determined by "a", "the" and "said" in their singular forms in the present disclosure and the appended claims are also intended to include plurality, unless clearly indicated otherwise in the context. It should also be understood that the term "and/or" as used herein refers to and includes any and all possible combinations of one or more of the associated listed items.

It is to be understood that, although terms "first," "second," "third," and the like may be used in the present disclosure to describe various information, such information should not be limited to these terms. These terms are only used to distinguish one category of information from another. For example, without departing from the scope of the present disclosure, first information may be referred as second information; and similarly, the second information may also be referred as the first information. Depending on the context, the word "if" as used herein may be interpreted as "when" or "upon" or "in response to determining".

The data transmission method provided by the present disclosure is first described below from a base station side.

Embodiments of the present disclosure provide a data transmission method that can be used at a base station. FIG. 1 is a flowchart of a data transmission method according to an embodiment, which may include the following steps.

At step 101, a downlink control indication is broadcast to one or more terminals in a target state. In embodiments of the present disclosure, the downlink control indication includes a first indicator, information in the first indicator indicating presence of downlink data scheduling information for a target terminal, and the target state includes the idle state or the inactive state.

At step 102, downlink data associated with the downlink data scheduling information is broadcast. In embodiments of the present disclosure, the base station broadcasts a downlink control indication and broadcasts downlink data, such that multiple terminals may determine that the downlink control indication includes a first indicator indicating the presence of downlink data scheduling information for a terminal and, based on that indicator, receive the downlink data. The terminals may determine, based on the downlink control indication or the downlink data, whether the downlink data is data sent to themselves.

In the above embodiment, the purpose of sending the downlink data to terminal(s) in an idle or inactive state is achieved, allowing the terminal(s) to receive the downlink data without having to enter a connected state, therefore the method has high availability.

In an optional embodiment, for enabling the downlink control indication to indicate the presence of the downlink data scheduling information for the terminal in the target state described above, a bit value of a bit field of the first indicator can be set to a preset bit value. The first indicator may be a short message indicator.

Figure 2:
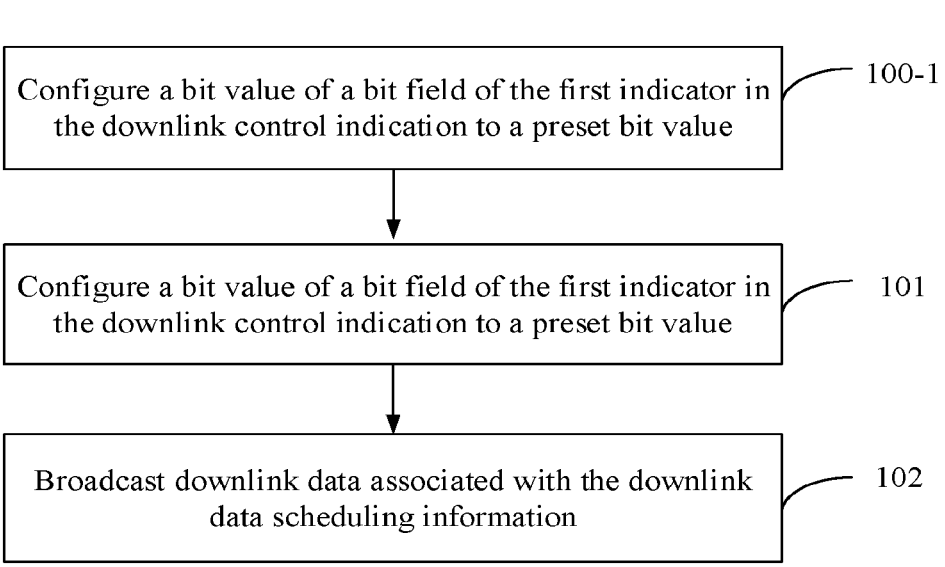
FIG. 2 is a flowchart illustrating another data transmission method according to an embodiment.

FIG. 2 is a flowchart illustrating another data transmission method according to the embodiment shown in FIG. 1, and the method further includes the following step.

At step 100-1, a bit value of a bit field of the first indicator in the downlink control indication is configured to a preset bit value. In an embodiment of the present disclosure, the short message indicator may be used as a first indicator in an existing communication protocol standard, taking into account the presence of a reserved entry in bit values of a bit field of the short message indicator. The bit values of the bit field of the short message indicator with the corresponding indication contents are shown in Table 1.

| Bit value in bit field | Corresponding indication content |
|---|---|
| 00 | Reserved |
| 01 | Only scheduling information for paging is present in the downlink control indication |
| 10 | Only short message is present in the downlink control indication |
| 11 | Both scheduling information for paging and short message are present in the downlink control indication |

According to Table 1, it can be seen that when the bit value of the bit field of the short message indicator is 00, the content of the corresponding indication is not yet defined in the existing standard. Therefore, in the embodiments of the present disclosure, the short message indicator may be used as the first indicator. One or more terminals are informed the current present of the downlink data scheduling information for a terminal via the bit value of the bit field of the first indicator setting to the preset bit value 00, which corresponds to the reserved entry, and Table 1 is correspondingly updated to Table 2.

TABLE 2

| Bit value in bit field | Corresponding indication content |
|---|---|
| 00 | Downlink data scheduling information is present in the downlink control indication |
| 01 | Only scheduling information for paging is present in the downlink control indication |
| 10 | Only short message is present in the downlink control indication |
| 11 | Both scheduling information for paging and short message are present in the downlink control indication |

In this embodiment of the present disclosure, the first indicator is a short message indicator, a preset bit value is 00. Since a format of the downlink control information corresponding to the short message indicator is format 1_0, a format of the downlink control indication is format 1_0 too. In addition, the downlink control indication in format 1_0 is to be scrambled by P-RNTI (Paging-Radio Network Temporary Identifier) before broadcasting.

Thus, after the execution of step 100-1, the base station broadcasts, at step 101, the downlink control indication which is in format 1_0 and scrambled by P-RNTI.

In the above embodiments, the base station, by configuring the bit value of the bit field of the first indicator in the downlink control indication to the preset bit value, causes a terminal in the target state to determine, on the basis of this downlink control indication, that the contents of the first indicator indicates the presence of the downlink data scheduling information for the terminal, so that the terminal can subsequently be enabled to, without entering the connected state, receive the downlink data broadcast by the base station. Thus, the method has high availability.

Figure 3:
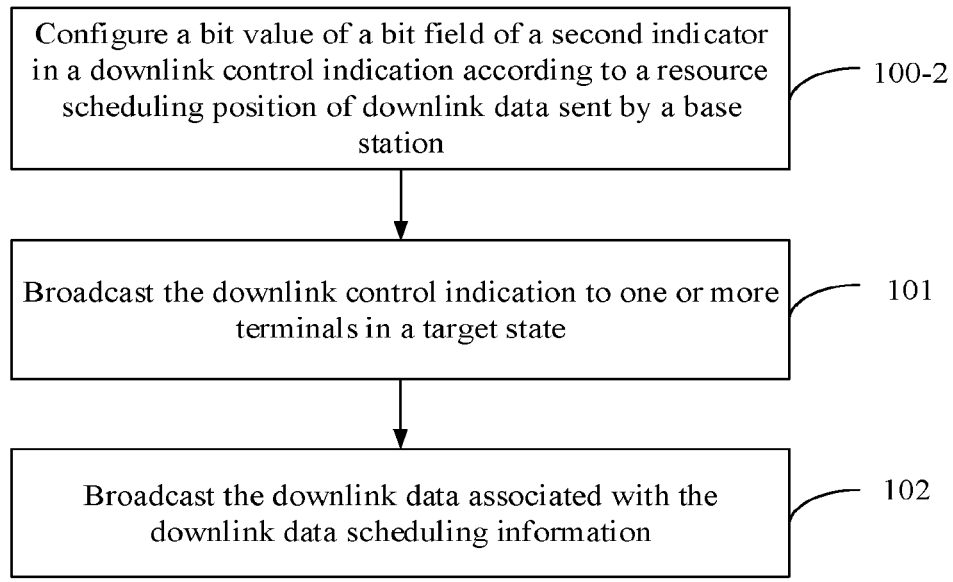
FIG. 3 is a flowchart illustrating another data transmission method according to an embodiment.

FIG. 3 is a flowchart of another data transfer method in accordance with the embodiment shown in FIG. 1. In an optional embodiment, the method further includes the following.

At step 100-2, a bit value of a bit field of a second indicator in the downlink control indication is configured according to a resource scheduling position of the downlink data sent by the base station. In this embodiments of the present disclosure, the second indicator uses a PDCCH (Physical Downlink Control Channel) indicator of the downlink control indication. By setting the bit value of the bit field of the second indicator, the base station informs the terminal about the resource scheduling position of the downlink data which is sent subsequently.

In an optional implementation, step 102 may include broadcasting the downlink data at the resource scheduling position indicated by the second indicator. In the above embodiments, the base station may broadcast the downlink data at the resource scheduling position indicated by the second indicator, such that the terminal(s) in the target state can receive the downlink data, which is easy to implement and highly usable.

In another optional implementation, it is also possible to not add a resource scheduling position to the downlink control indication, where the base station broadcasts the downlink data directly at a resource scheduling position pre-agreed in a communication protocol. The terminal side can also receive the downlink data at the pre-agreed resource scheduling location.

In the above embodiments, the base station may configure the bit value of the bit field of the second indicator in the downlink control indication according to the resource scheduling location at which the downlink data is to be sent, and broadcast the downlink data at the resource scheduling location indicated by the second indicator. Alternatively, the base station can broadcast the downlink data at a pre-agreed resource scheduling location directly according to the communication protocol. The methods are easy to implement and high usable.

In an optional embodiment, the base station may include the identification of the target terminal in the broadcast downlink control indication, where the identification of the target terminal indicates an identifier of a terminal to which the downlink data is to be sent. The terminal identification is any information indicative of a UE ID or UE identity, including, but not limited to, a mobile phone number, an IMSI (International Mobile Subscriber Identity) number, etc. Alternatively, the base station may also include the identification of the target terminal in the downlink data.

Upon receiving the downlink data broadcast by the base station, the terminal side can determine whether the downlink data is for itself based on the identification of the target terminal.

In the above embodiments, the base station may include the identification of the target terminal in the downlink control indication or downlink data, such that a terminal determines whether the downlink data sent by the base station is directed to the terminal itself based on the identification of the target terminal, achieving the purpose of broadcasting downlink data to the target terminal in the target state.

The data transmission method provided by the present disclosure is described again from the terminal side below.

Figure 4:
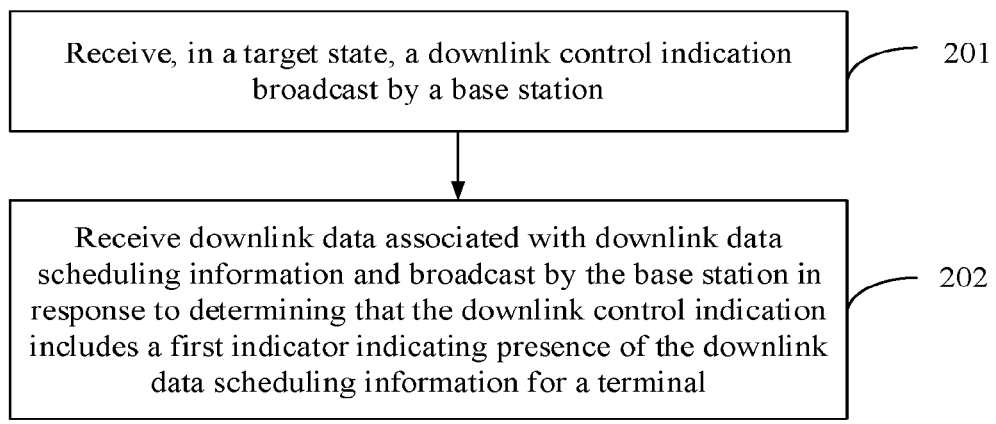
FIG. 4 is a flowchart illustrating a method of data transmission at a terminal according to an embodiment.

FIG. 4 is a flowchart of a method of data transmission at a terminal according to an embodiment. In an embodiment, referring to FIG. 4, the method includes the following steps.

At step 201, a downlink control indication broadcast by a base station is received in a target state. The target state includes an idle state or an inactive state. The downlink control indication may be a downlink control indication in format 1_0 after scrambling by P-RNTI.

At step 202, in response to determining that the downlink control indication includes a first indicator and information in the first indicator is configured to indicate the presence of downlink data scheduling information for a target terminal, downlink data associated with the downlink data scheduling information broadcast by the base station is received.

In embodiments of the present disclosure, a terminal in the idle state or the inactive state determines that the downlink control indication includes a first indicator, and a value of the first indicator indicates the current presence of downlink data scheduling information for the target terminal based on the downlink control indication broadcast by the base station, then the terminal can receive, without entering a connected state, the downlink data associated with the downlink data scheduling information, where the downlink data is broadcast by the base station.

In the embodiments, the terminal can receive the downlink data broadcast by the base station while the terminal is in an idle state or an inactive state. Thus, the terminal can receive the downlink data without having to enter the connected state. The method has high availability.

Figure 5:
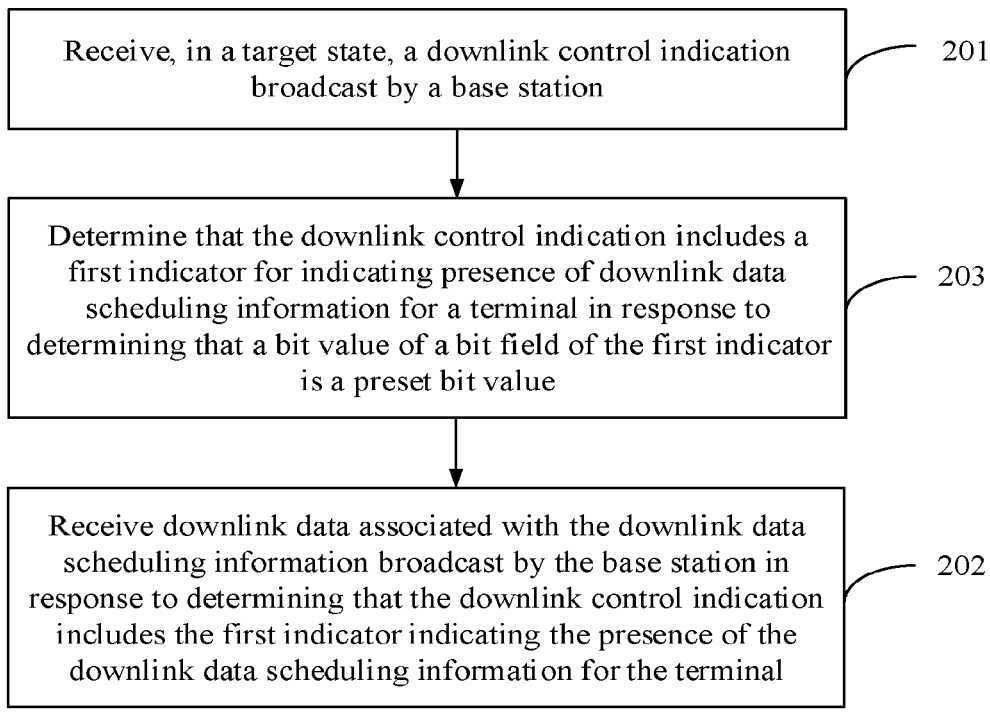
FIG. 5 is a flowchart illustrating another method of data transmission at a terminal according to an embodiment.

FIG. 5 is a flowchart illustrating an alternative data transmission method according to the embodiment shown in FIG. 4, in an optional embodiment, the method may further include the following step.

At step 203, in response to determining that a bit value of a bit field of the first indicator is a preset bit value, it is determined that the information in the first indicator is configured to indicate the presence of the downlink data scheduling information for the terminal. In embodiments of the present disclosure, the first indicator may be a short message indicator, and the preset bit value may be 00. The terminal, in response to determining that the bit value of the short message indicator's bit field included in the downlink control indication is the preset bit value 00, may determine that the downlink control indication includes the information indicating the current presence of downlink data scheduling information for the terminal. Further, the terminal may perform step 202 to receive the downlink data related to the downlink data scheduling information broadcast by the base station.

In the above embodiments, the terminal can determine whether the downlink control indication includes the information for indicating the current presence of the downlink data scheduling information for the terminal based on the bit value of the bit field of the first indicator in the downlink control indication. The method is with high usability.

Figure 6A:
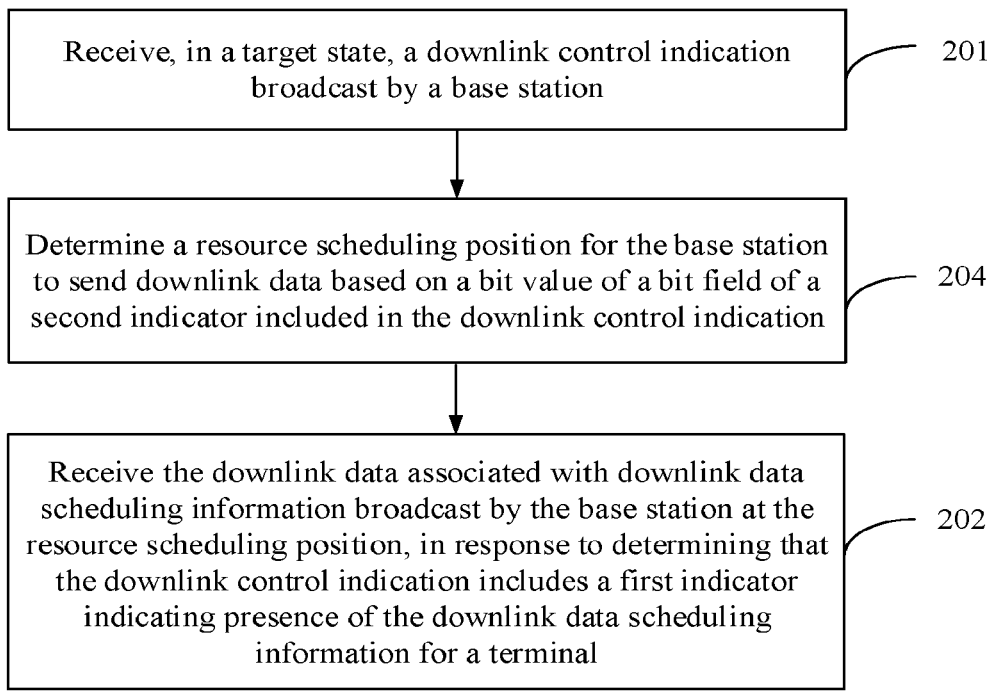
FIG. 6A is a flowchart illustrating another method of data transmission at a terminal according to an embodiment.

FIG. 6A is a flowchart illustrating another data transmission method according to the embodiment shown in FIG. 4, in an optional embodiment, the method may further include the following step.

At step 204, based on a bit value of a bit field of a second indicator included in the downlink control indication, a resource scheduling position for the base station to send the downlink data is determined. The terminal may determine the resource scheduling position for the base station to send the downlink data by reading the bit value of the bit field of the second indicator included in the downlink control indication. The second indicator may be a PDCCH indicator.

Figure 6B:
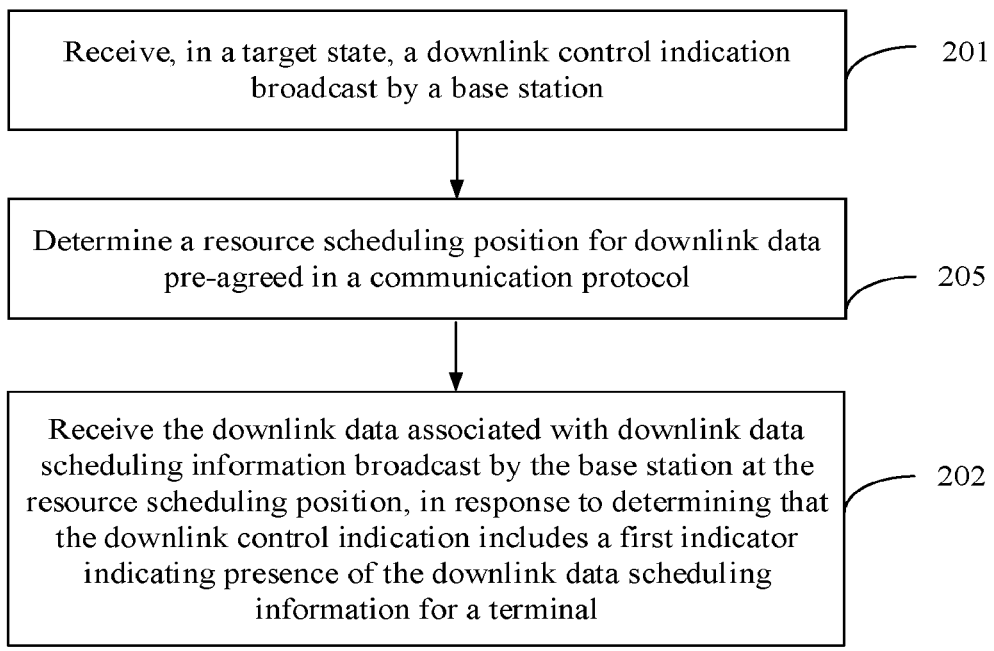
FIG. 6B is a flowchart illustrating another method of data transmission at a terminal according to an embodiment.

Further, step 202 may include receiving the downlink data at the resource scheduling position. In addition to the above approach, the resource scheduling position for the downlink data may be pre-agreed in the communication protocol. FIG. 6B is a flowchart illustrating another data transmission method according to the embodiment shown in FIG. 4, referring to FIG. 6B, the method may further include the following step.

At step 205, a resource scheduling position for the downlink data pre-agreed in a communication protocol is determined. In embodiments of the present disclosure, the terminal may directly address the resource scheduling position for the base station to send the downlink data based on the pre-agreed information in the communication protocol, without reading the bit value of the bit field of the second indicator in the downlink control indication.

Further, during the execution of step 202, the terminal may also receive the downlink data at this resource scheduling position. In the above embodiments, the terminal can read the bit value of the bit field of the second indicator in the downlink control indication to determine the resource scheduling location at which the base station broadcasts the downlink data, or the terminal can directly determine this resource scheduling location via the pre-agreed information in the communication protocol. The terminal receives the downlink data at the resource scheduling location. In this way, the terminal can receive downlink data without entering a connected state, which is easy to implement and high usable.

Figure 7:
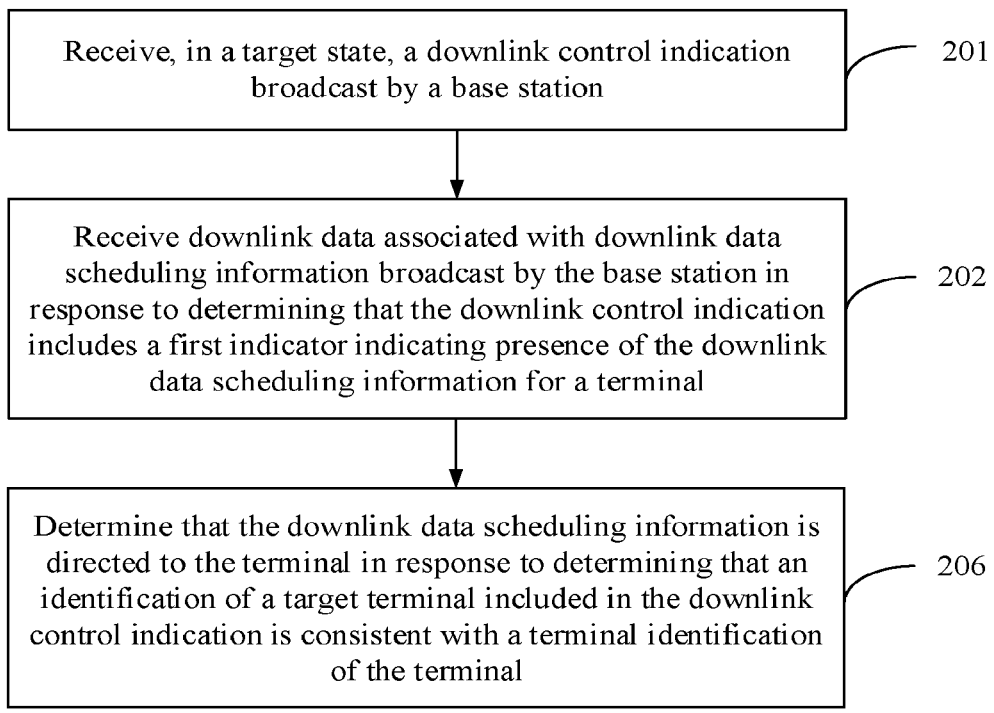
FIG. 7 is a flowchart illustrating another method of data transmission at a terminal according to an embodiment.

FIG. 7 is a flowchart illustrating another data transmission method according to the embodiment shown in FIG. 4, in an optional embodiment, the method may further include the following step.

At step 206, in response to determining that an identification of a target terminal included in the downlink control indication is consistent with a terminal identification of the terminal, it is determined that the downlink data scheduling information is directed to the terminal. In embodiments of the present disclosure, the identification of the target terminal is used to indicate an identifier of a terminal to which the downlink data is directed. The terminal identification is any information indicative of a UE ID or UE identity, including, but not limited to, a mobile phone number, an IMSI number, etc.

A terminal may determine whether the identification of the target terminal included in the downlink control indication is identical to its own terminal identification, and thus determine whether the downlink data schedule information is for the terminal itself. If the two identifications are different, it can be assumed that the downlink data scheduling information and the corresponding downlink data is not for that terminal and the downlink data can be discarded directly.

Figure 8:
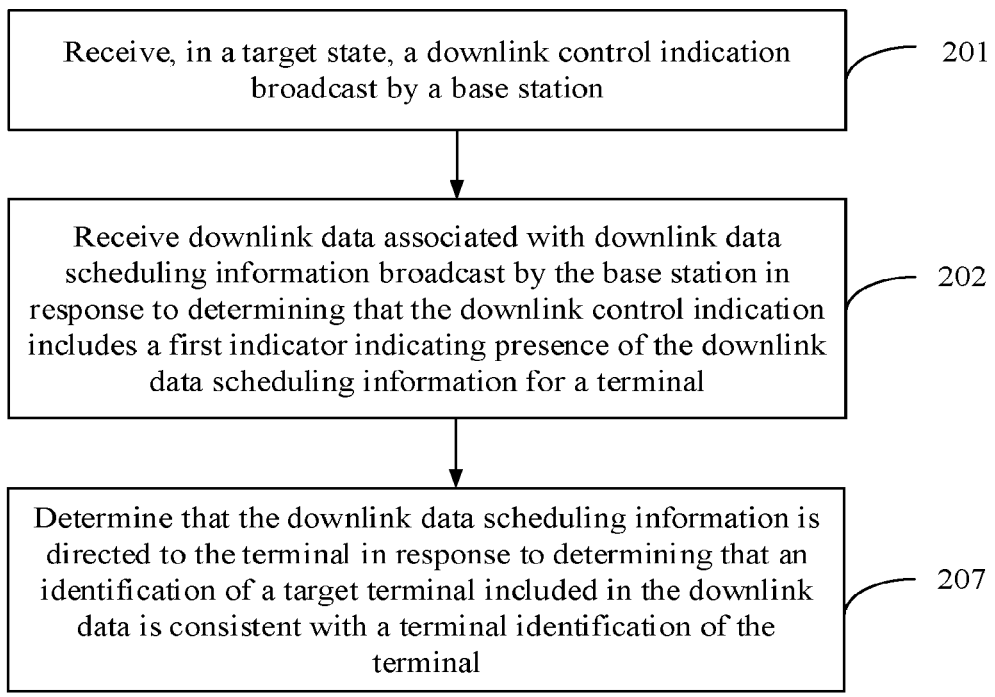
FIG. 8 is a flowchart illustrating another method of data transmission at a terminal according to an embodiment.

FIG. 8 is a flowchart illustrating another data transmission method according to the embodiment shown in FIG. 4, in an optional embodiment, the method may further include the following step.

At step 207, in response to determining that an identification of a target terminal included in the downlink data is consistent with a terminal identification of the terminal, it is determined that the downlink data scheduling information is directed to the terminal.

In embodiments of the present disclosure, the base station may include the identification of the target terminal in the downlink data, and the terminal may compare the identification of the target terminal with its own terminal identification to determine whether the two are consistent, and if the two identifications are the same, the terminal may determine that the downlink data scheduling information and the downlink data are for the terminal itself. If the two identifications are different, the terminal can determine that the downlink data scheduling information and the downlink data are directed to another terminal, and discard the downlink data directly.

In the above embodiments, the terminal can determine whether the downlink data is for the terminal itself based on the identification of the target terminal in the downlink control indication or in the downlink data, which is easy to implement and highly usable.

Figure 9:
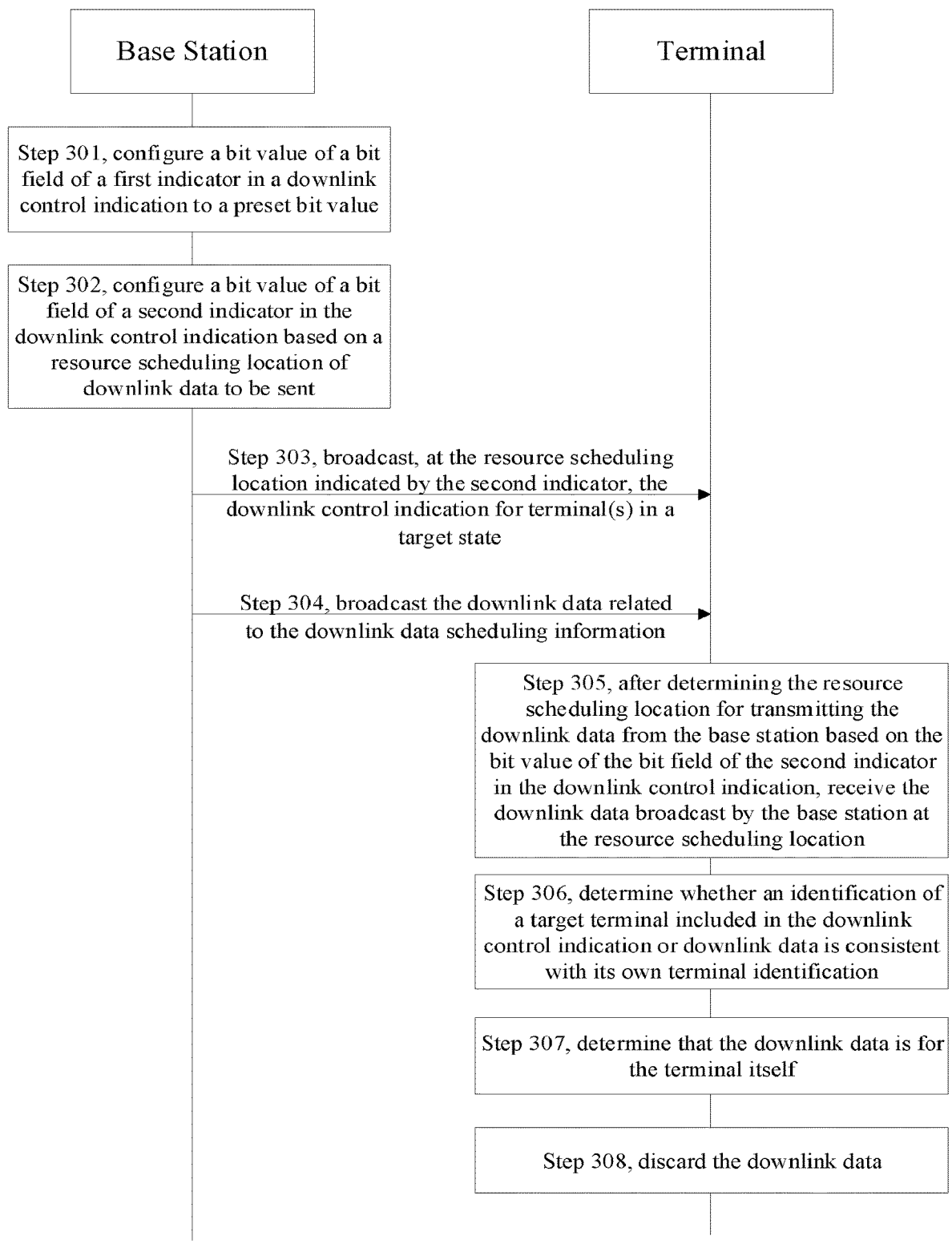
FIG. 9 is a flowchart illustrating another data transmission method according to an embodiment.

FIG. 9 is a flowchart illustrating another data transmission method according to the embodiment. In an embodiment, the method may further include the following steps.

At step 301, a base station configures a bit value of a bit field of a first indicator in a downlink control indication to a preset bit value. The preset bit value is a pre-agreed bit value in a communication protocol, which corresponds to current presence of downlink data scheduling information for a terminal.

At step 302, the base station configures a bit value of bit field of a second indicator in the downlink control indication according to a resource scheduling location at which downlink data is to be sent.

At step 303, the base station broadcasts a downlink control indication for terminal(s) in a target state. The target state includes an idle state or an inactive state.

At step 304, the base station broadcasts the downlink data associated with the downlink data scheduling information at the resource scheduling location indicated by the second indicator.

At step 305, a terminal determines that the base station is to broadcast downlink data base on a bit value in a first indicator included in a received downlink control indication, and after determining the resource scheduling location for transmitting the downlink data from the base station based on the bit value of the bit field of the second indicator in the downlink control indication, the terminal receives the downlink data broadcast by the base station at the resource scheduling location.

At step 306, the terminal determines whether an identification of a target terminal included in the downlink control indication or downlink data is consistent with its own terminal identification. If the two identifications are the same, step 307 is performed, otherwise step 308 is performed.

At step 307, the terminal determines that the downlink data is for the terminal itself.

At step 308, the terminal discards the downlink data.

In the above embodiments, the resource scheduling location for the downlink data can also be pre-agreed in a communication protocol, then the terminal does not read the bit value of the bit value field of the second indicator after receiving the downlink control indication. The terminal can receive the downlink data broadcast by the base station at the resource scheduling location directly after determining the resource scheduling location according to the communication protocol agreement.

With the above embodiments, the purpose of a base station sending downlink data to a terminal in an idle or inactive state is achieved, allowing the terminal to receive downlink data without having to enter a connected state. The methods have high availability.

Corresponding to the foregoing embodiments of application function implementation methods, the present disclosure also provides embodiments of application function implementation apparatuses.

Figure 10:
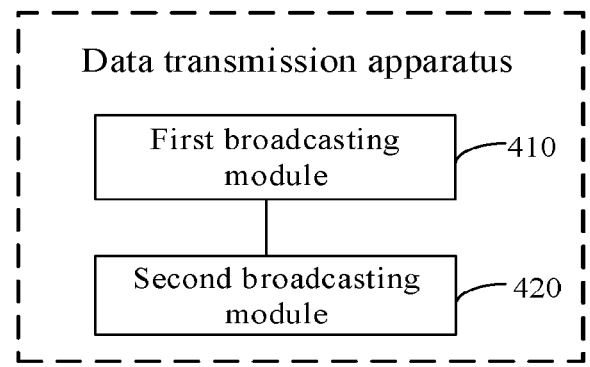
FIG. 10 is a block diagram illustrating a data transmission apparatus according to an embodiment.

Referring to FIG. 10, which is a block diagram of a data transmission apparatus according to an embodiment, the apparatus includes a first broadcasting module 410 and a second broadcasting module 420. The first broadcasting module 410 is configured to broadcast a downlink control indication to one or more terminals in a target state, where the downlink control indication includes a first indicator indicating presence of downlink data scheduling information for a terminal, and the target state includes an idle state or an inactive state. The second broadcasting module 420 is configured to broadcast downlink data associated with the downlink data scheduling information.

Figure 11:
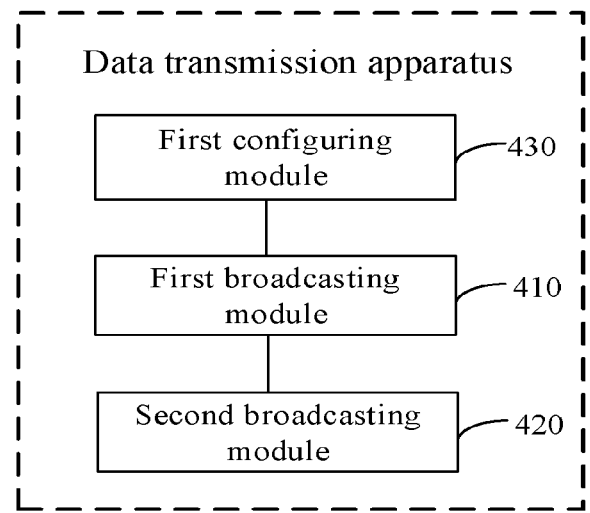
FIG. 11 is a block diagram illustrating another data transmission apparatus according to an embodiment.

FIG. 11 is a block diagram of another data transmission apparatus illustrated according to FIG. 10, the apparatus further includes a first configuring module 430 configured to configure a bit value of a bit field of the first indicator in the downlink control indication to a preset bit value, where the preset bit value is a bit value corresponding to the presence of the downlink data scheduling information for the terminal which is pre-agreed in a communication protocol.

Figure 12:
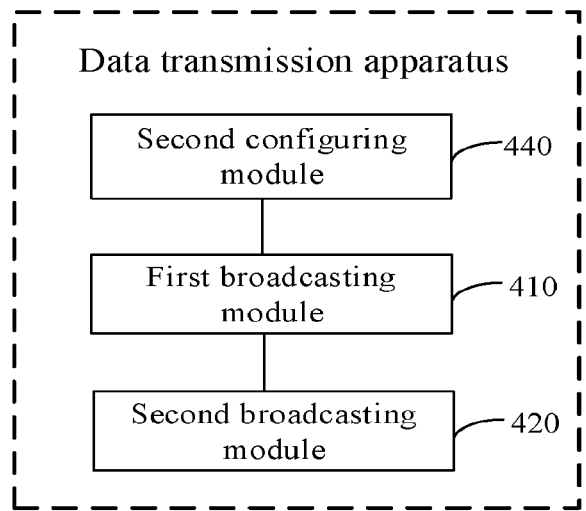
FIG. 12 is a block diagram illustrating another data transmission apparatus according to an embodiment.

FIG. 12 is a block diagram of another data transmission apparatus illustrated according to FIG. 10, the apparatus further includes a second configuring module 440 configured to configure a bit value of a bit field of a second indicator in the downlink control indication according to a resource scheduling position of the downlink data sent by the base station, where the second indicator indicates the resource scheduling position.

Figure 13:
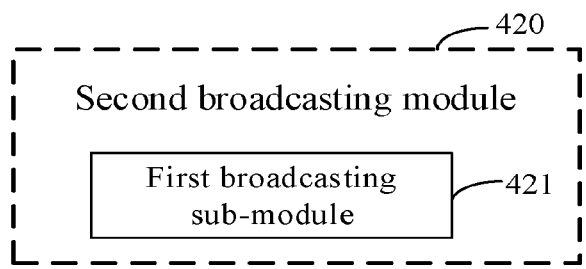
FIG. 13 is a block diagram illustrating another data transmission apparatus according to an embodiment.

FIG. 13 is a block diagram of another data transmission apparatus illustrated according to FIG. 12, the second broadcasting module 420 includes a first broadcasting sub-module 421 configured to broadcast the downlink data at the resource scheduling position indicated by the second indicator.

Figure 14:
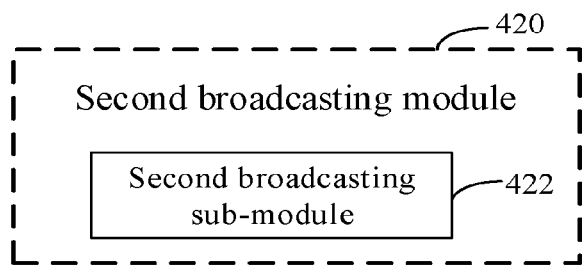
FIG. 14 is a block diagram illustrating another data transmission apparatus according to an embodiment.

FIG. 14 is a block diagram of another data transmission apparatus illustrated according to FIG. 10, the second broadcasting module 420 includes a second broadcasting sub-module 422 configured to broadcast the downlink data at a resource scheduling position pre-agreed in a communication protocol.

Optionally, the downlink control indication includes an identification of a target terminal. Optionally, the downlink data includes an identification of a target terminal.

Figure 15:
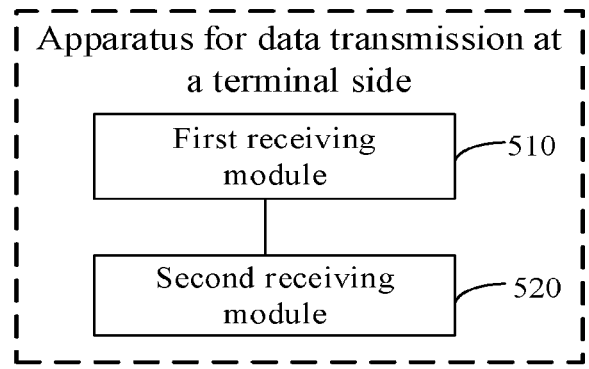
FIG. 15 is a block diagram illustrating an apparatus for data transmission at a terminal according to an embodiment.

Referring to FIG. 15, which is a block diagram of an apparatus for data transmission at a terminal according to an embodiment, the apparatus includes a first receiving module 510 and a second receiving module 520.

The first receiving module 510 is configured to receive, in a target state, a downlink control indication broadcast by a base station, where the target state includes an idle state or an inactive state.

The second receiving module 520 is configured to receive downlink data associated with downlink data scheduling information broadcast by the base station in response to determining that the downlink control indication comprises a first indicator indicating presence of the downlink data scheduling information for a terminal.

Figure 16:
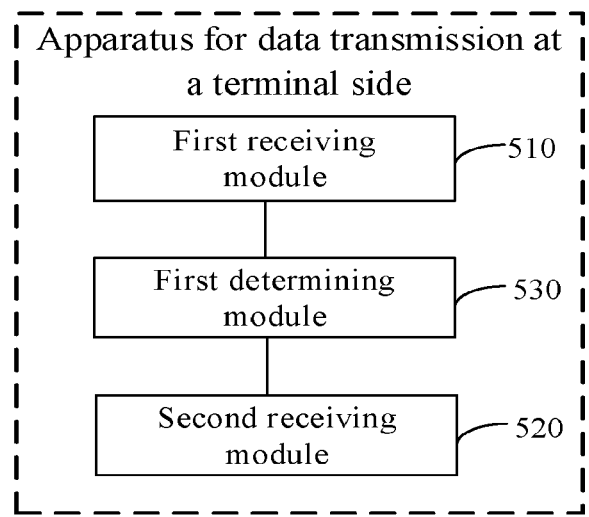
FIG. 16 is a block diagram illustrating another apparatus for data transmission at a terminal according to an embodiment.

FIG. 16 is a block diagram of another data transmission apparatus illustrated according to FIG. 15, the apparatus further includes a first determining module 530 configured to determine that the downlink control indication comprises the first indicator indicating the presence of the downlink data scheduling information for the terminal in response to determining that a bit value of a bit field of the first indicator is a preset bit value.

Figure 17:
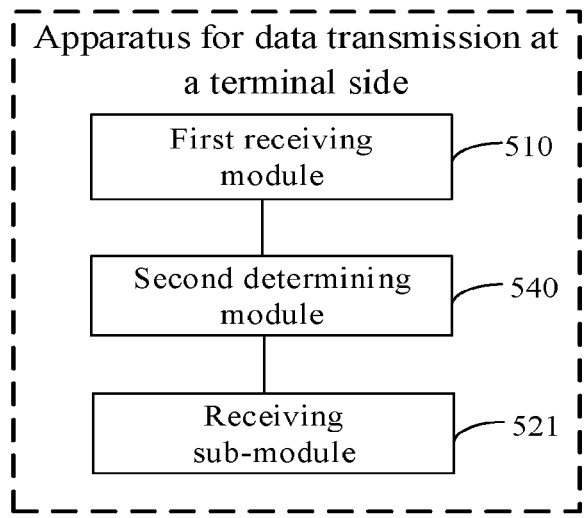
FIG. 17 is a block diagram illustrating another apparatus for data transmission at a terminal according to an embodiment.

FIG. 17 is a block diagram of another data transmission apparatus illustrated according to FIG. 16, the apparatus further includes a second determining module 540 configured to determine a resource scheduling position for the base station to send the downlink data based on a bit value of a bit field of a second indicator comprised in the downlink control indication, or determine the resource scheduling position for the downlink data which is pre-agreed in a communication protocol.

The second receiving module 520 includes a receiving sub-module 521 configured to receive the downlink data at the resource scheduling position.

Figure 18:
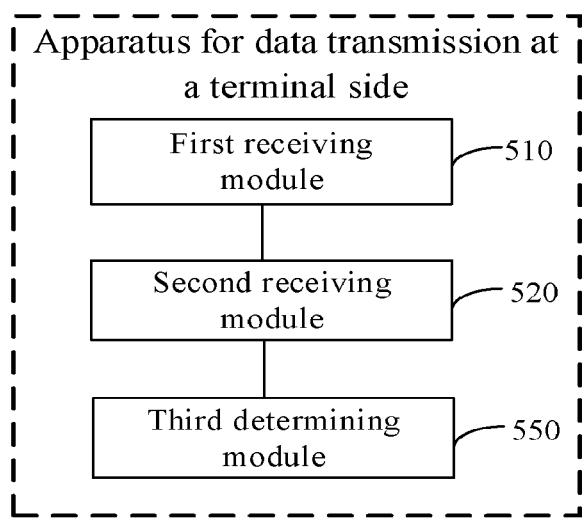
FIG. 18 is a block diagram illustrating another apparatus for data transmission at a terminal according to an embodiment.

FIG. 18 is a block diagram of another data transmission apparatus illustrated according to FIG. 15, the apparatus further includes a third determining module 550 configured to determine that the downlink data scheduling information is directed to the terminal in response to determining that an identification of a target terminal comprised in the downlink control indication is consistent with a terminal identification of the terminal.

Figure 19:
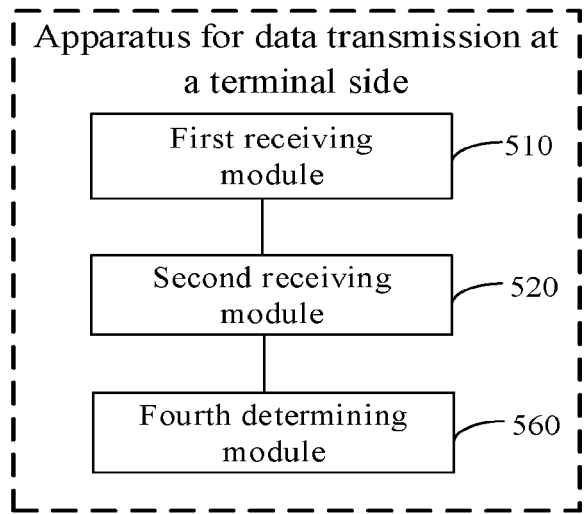
FIG. 19 is a block diagram illustrating another apparatus for data transmission at a terminal according to an embodiment.

FIG. 19 is a block diagram of another data transmission apparatus illustrated according to FIG. 15, the apparatus further includes a fourth determining module 560 configured to determine that the downlink data scheduling information is directed to the terminal in response to determining that an identification of a target terminal comprised in the downlink data is consistent with a terminal identification of the terminal.

Figure 20:
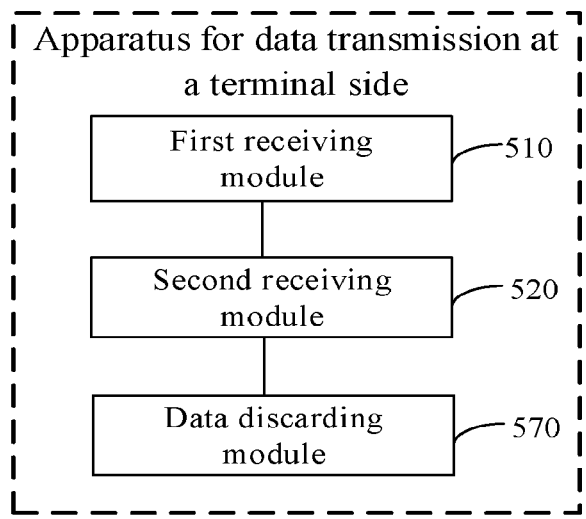
FIG. 20 is a block diagram illustrating another apparatus for data transmission at a terminal according to an embodiment.

FIG. 20 is a block diagram of another data transmission apparatus illustrated according to FIG. 15, the apparatus further includes a data discarding module 570 configured to discard the downlink data in response to determining that the identification of the target terminal is not consistent with the terminal identification of the terminal.

As for the apparatus embodiments, since they substantially correspond to the method embodiments, relevant parts may be referred to the part of the description of the method embodiments. The apparatus embodiments described above are merely illustrative. The units described above as separate components may or may not be physically separated, and the components displayed as units may or may not be physical units, that is, they may be located at a position, or they may be distributed over multiple network units. Some or all of the modules may be selected according to actual requirement to achieve the objectives of the solutions of the present disclosure. One of ordinary skill in the art can understand and implement it without any creative works.

Accordingly, the present disclosure further provides a computer readable storage medium, the storage medium stores a computer program, and the computer program are used to perform any data transmission method of the base station side.

Accordingly, the present disclosure further provides a computer readable storage medium, the storage medium stores a computer program, and the computer program are used to perform any data transmission method of the terminal side.

Accordingly, the present disclosure also provides a data transmission apparatus, which includes one or more processors and a memory for storing instructions executable by the one or more processors. The one or more processors are configured to broadcast a downlink control indication to one or more terminals in a target state, the downlink control indication comprising a first indicator, information in the first indicator indicating presence of downlink data scheduling information for a target terminal, the target state comprising an idle state or an inactive state, and broadcast downlink data associated with the downlink data scheduling information.

Figure 21:
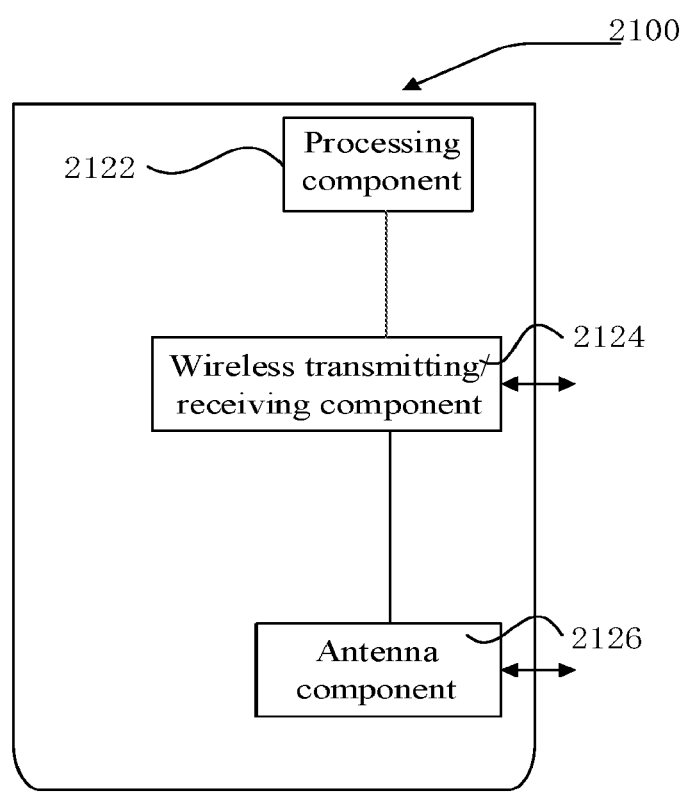
FIG. 21 is a schematic structural diagram illustrating a data transmission apparatus according to an embodiment of the present disclosure.

FIG. 21 is a schematic structural diagram of data transmission apparatus 2100 according to an embodiment. The apparatus 2100 can be provided as a base station. As shown in FIG. 21, the base station 2100 includes a processing component 2122, a wireless transmitting/receiving component 2124, an antenna component 2126, and a signal processing part unique to a wireless interface. The processing component 2122 may further include one or more processors.

One of the processors in the processing component 2122 may be configured to perform any one of the above data transmission methods.

Accordingly, the present disclosure also provides an apparatus for data transmission at a terminal, which includes one or more processors and a memory for storing instructions executable by the one or more processors. The one or more processors being configured to receive, in a target state, a downlink control indication broadcast by a base station, the target state comprising an idle state or an inactive state, and receive downlink data associated with downlink data scheduling information broadcast by the base station in response to determining that the downlink control indication comprises a first indicator and information in the first indicator is configured to indicate presence of the downlink data scheduling information for a target terminal.

Figure 22:
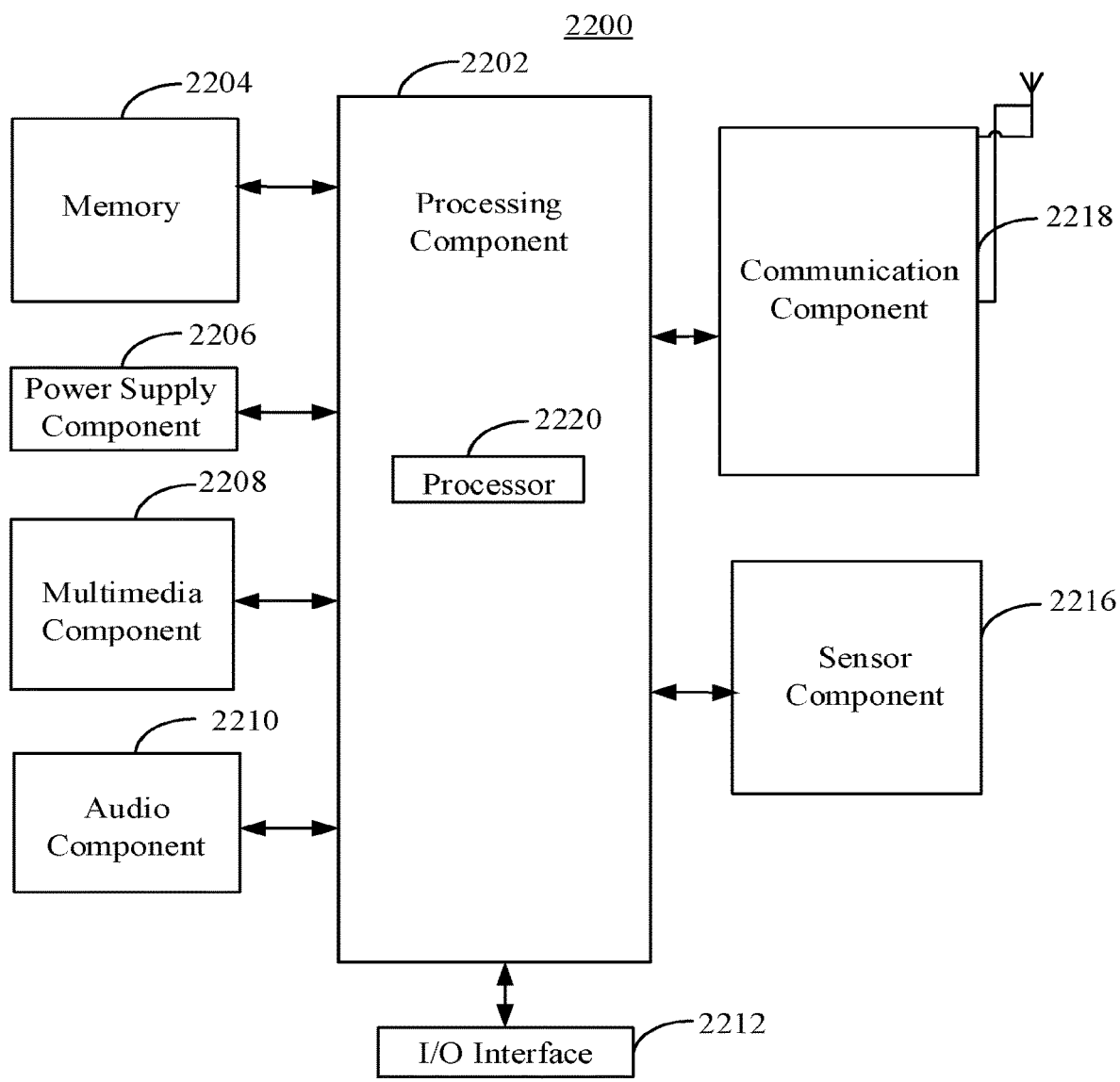
FIG. 22 is a schematic structural diagram illustrating an apparatus for data transmission at a terminal according to an embodiment of the present disclosure.

FIG. 22 is a schematic structural diagram of electrical device 2200 according to an embodiment. For example, the electrical device 2200 may be a terminal, such as a mobile phone, a tablets, an e-book reader, a multimedia playback device, a wearable device, a car terminal, iPad®, smart TV, etc.

As shown in FIG. 22, the electrical device 2200 may include one or more of the following components: a processing component 2202, a memory 2204, a power supply component 2206, a multimedia component 2208, an audio component 2210, an input/output (I/O) interface 2212, a sensor component 2216, and a communication component 2218.

The processing component 2202 generally controls overall operations of the electrical device 2200, such as operations associated with display, phone calls, data communications, camera operations, and recording operations. The processing component 2202 may include one or more processors 2220 for executing instructions to complete all or a part of steps of the above data transmission method. In addition, the processing component 2202 may include one or more modules which facilitate the interaction between the processing component 2202 and other components. For example, the processing component 2202 may include a multimedia module to facilitate the interaction between the multimedia component 2208 and the processing component 2202. For another example, the processing component 2202 may read executable instructions from the memory to implement the steps of one of the data transmission methods provided in the above embodiments.

The memory 2204 may be configured to store various types of data to support the operation of the electrical device 2200. Examples of such data include instructions for any application or method operated on the electrical device 2200, contact data, phonebook data, messages, pictures, videos, and so on. The memory 2204 may be implemented by any type of volatile or non-volatile memory devices or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a magnetic, or compact disk.

The power supply component 2206 may provide power to different components of the electrical device 2200. The power supply component 2206 may include a power management system, one or more power supplies and other components associated with generating, managing, and distributing power for the electrical device 2200.

The multimedia component 2208 may include a screen providing an output interface between the electrical device 2200 and a user. In some examples, the multimedia component 2208 may include a front camera and/or a rear camera. The front camera and/or rear camera may receive external multimedia data when the electrical device 2200 is in an operating mode, such as a photographing mode or a video mode. Each of the front camera and the rear camera may be a fixed optical lens system or have focal length and optical zooming capability.

The audio component 2210 may be configured to output and/or input an audio signal. For example, the audio component 2210 may include a microphone (MIC) configured to receive an external audio signal when the electrical device 2200 is in an operating mode, such as a call mode, a recording mode, and a voice recognition mode. The received audio signal may be further stored in the memory 2204 or sent via the communication component 2218. In some examples, the audio component 2210 further includes a speaker to output an audio signal.

The I/O interface 2212 provides an interface between the processing component 2202 and peripheral interface modules. The above peripheral interface modules may be a keyboard, a click wheel, buttons, and so on. These buttons may include, but are not limited to, a home button, a volume button, a starting button, and a locking button.

The sensor component 2216 may include one or more sensors to provide status assessments of various aspects for the electrical device 2200. For example, the sensor component 2216 may detect an on/off state of the electrical device 2200, and relative positioning of component, for example, the component is a display and a mini-keypad of the electrical device 2200. The sensor component 2216 may also detect a change in position of the electrical device 2200 or a component of the electrical device 2200, a presence or absence of the contact between a user and the electrical device 2200, an orientation or an acceleration/deceleration of the electrical device 2200, and a change in temperature of the electrical device 2200. The sensor component 2216 may include a proximity sensor configured to detect the presence of a nearby object without any physical contact. The sensor component 2216 may further include an optical sensor, such as a CMOS or CCD image sensor which is used in imaging applications. In some examples, the sensor component 2216 may further include an acceleration sensor, a gyroscope sensor, a magnetic sensor, a pressure sensor, or a temperature sensor.

The communication component 2218 may be configured to facilitate wired or wireless communication between the electrical device 2200 and other devices. The electrical device 2200 may access a wireless network that is based on any communication standard, such as Wi-Fi, 2G, 3G, 4G, 5G, or a combination thereof. In an example, the communication component 2218 receives broadcast signals or broadcast-associated information from an external broadcast management system via a broadcast channel. In an example, the communication component 2218 further includes a Near Field Communication (NFC) module to facilitate short-range communications. For example, the NFC module may be implemented based on a Radio Frequency Identification (RFID) technology, an Infrared Data Association (IrDA) technology, an Ultra Wideband (UWB) technology, a Bluetooth® (BT) technology and other technologies.

In an example, the electrical device 2200 may be implemented by one or more application specific integrated circuits (ASICs), digital signal processors (DSPs), digital signal processing devices (DSPDs), programmable logic devices (PLDs), field programmable gate arrays (FPGAs), controllers, microcontrollers, microprocessors or other electronic components for performing the above data transmission methods.

In an example, there is also provided a non-transitory machine-readable storage medium including instructions, such as the memory 2204 including instructions. The above instructions may be executed by the processor 2220 of the electrical device 2200 to perform the above methods. For example, the non-transitory machine-readable storage medium may be a ROM, a RAM, a CD-ROM, a magnetic tape, a floppy disk, and an optical data storage device and so on.

Embodiments of the present disclosure provide technical solutions that may include the following beneficial effects.

In embodiments of the present disclosure, a base station achieves the purpose of sending downlink data to a terminal in an idle state or an inactive state by broadcasting a downlink control indication for a terminal in a target state and broadcasting the downlink data associated with downlink data scheduling information, such that the terminal can receive the downlink data without entering a connected state. The method is with high availability.

In embodiments of the present disclosure, the base station, by configuring a bit value of bit field of a first indicator in the downlink control indication to a preset bit value, causes the terminal to determine that the downlink control indication includes the first indicator and information in the first indicator indicating the current existence of the downlink data scheduling information for a terminal, so that a terminal in the target state can subsequently be to receive the downlink data sent by the base station, which has high availability.

In embodiments of the present disclosure, the base station may also configure a bit value of a bit field of a second indicator in the downlink control indication based on a resource scheduling position for sending the downlink data, and broadcasts the downlink data at the resource scheduling position indicated by the second indicator. Alternatively, the base station can broadcast the downlink data at the resource scheduling position directly which is pre-agreed in a communication protocol. The method is easy to implement and has high availability.

In embodiments of the present disclosure, the base station may include an identification of a target terminal in the downlink control indication or downlink data, and then the terminal determines whether the downlink data sent by the base station is for itself based on the identification of the target terminal, achieving the purpose of sending downlink data to a target terminal in the target state.

Other implementations of the present disclosure will be apparent to those skilled in the art from consideration of the specification and practice of the present disclosure herein. The present disclosure is intended to cover any variations, usages, or adaptations of the present disclosure that follow the general principles thereof and include common knowledge or conventional technical means in the related art that are not disclosed in the present disclosure. The specification and examples are considered as exemplary only, with a true scope and spirit of the present disclosure being indicated by the following claims.

It is to be understood that the present disclosure is not limited to the precise structure described above and shown in the accompanying drawings, and that various modifications and changes may be made without departing from the scope thereof. The scope of the present disclosure is limited only by the appended claims.

The invention claimed is:

1. A data transmission method, comprising:
broadcasting a downlink control indication to one or more terminals in a target state, the downlink control indication comprising a first indicator, information in the first indicator indicating presence of downlink data scheduling information for a target terminal, the target state comprising an idle state or an inactive state; and
broadcasting downlink data associated with the downlink data scheduling information;
wherein broadcasting the downlink data associated with the downlink data scheduling information comprises:
configuring a bit value of a bit field of a second indicator in the downlink control indication according to a resource scheduling position of the downlink data sent by the base station, the second indicator indicating the resource scheduling position; and broadcasting the downlink data at the resource scheduling position indicated by the second indicator;
or
broadcasting the downlink data at a resource scheduling position pre-agreed in a communication protocol;
wherein the first indicator is a short message indicator, and a bit value of a bit field of the first indicator corresponds to a reserved entry of the short message indicator to inform the target terminal the presence of the downlink data scheduling information for the target terminal;

wherein the downlink control indication comprises an identification of the target terminal, or the downlink data comprises the identification of the target terminal.

2. The method of claim 1, further comprising:

configuring the bit value of the bit field of the first indicator in the downlink control indication to a preset bit value, the preset bit value being a bit value corresponding to the presence of the downlink data scheduling information for the target terminal which is pre-agreed in a communication protocol.

3. A method of data transmission at a terminal, comprising:

receiving, in a target state, a downlink control indication broadcast by a base station, the target state comprising an idle state or an inactive state; and receiving downlink data associated with downlink data scheduling information broadcast by the base station in response to determining that the downlink control indication comprises a first indicator and information in the first indicator is configured to indicate presence of the downlink data scheduling information for a target terminal;

wherein the method further comprises:

determining a resource scheduling position for the base station to send the downlink data based on a bit value of a bit field of a second indicator comprised in the downlink control indication; or determining the resource scheduling position for the downlink data which is pre-agreed in a communication protocol;

wherein receiving the downlink data associated with the downlink data scheduling information broadcast by the base station comprises:

receiving the downlink data at the resource scheduling position;

wherein the first indicator is a short message indicator, and a bit value of a bit field of the first indicator corresponds to a reserved entry of the short message indicator to inform the target terminal the presence of the downlink data scheduling information for the target terminal;

wherein the downlink control indication comprises an identification of the target terminal, or the downlink data comprises the identification of the target terminal.

4. The method of claim 3, further comprising:

determining that the information in the first indicator is configured to indicate the presence of the downlink data scheduling information for the target terminal in response to determining that the bit value of the bit field of the first indicator is a preset bit value.

5. The method of claim 3, further comprising:

determining that the downlink data scheduling information is directed to the terminal in response to determining that the identification of the target terminal comprised in the downlink control indication is consistent with a terminal identification of the terminal.

6. The method of claim 3, further comprising:

determining that the downlink data scheduling information is directed to the terminal in response to determining that the identification of the target terminal comprised in the downlink data is consistent with a terminal identification of the terminal.

7. The method of claim 5, further comprising:

discarding the downlink data in response to determining that the identification of the target terminal is not consistent with the identification of the target terminal.

8. A non-transitory computer-readable storage medium having a computer program stored thereon, the computer program being used to perform the data transmission method according to claim 1.

9. A non-transitory computer-readable storage medium having a computer program stored thereon, the computer program being used to perform the method of data transmission at the terminal according to claim 3.

10. A base station, comprising:

one or more processors; and a memory for storing instructions executable by the one or more processors, wherein the one or more processors are configured to perform the data transmission method according to claim 1.

11. A terminal, comprising:

one or more processors; and a memory for storing instructions executable by the one or more processors, wherein the one or more processors are configured to:

receive, in a target state, a downlink control indication broadcast by a base station, the target state comprising an idle state or an inactive state; and receive downlink data associated with downlink data scheduling information broadcast by the base station in response to determining that the downlink control indication comprises a first indicator and information in the first indicator is configured to indicate presence of the downlink data scheduling information for a target terminal;

wherein the one or more processors are further configured to:

determine a resource scheduling position for the base station to send the downlink data based on a bit value of a bit field of a second indicator comprised in the downlink control indication; or determine the resource scheduling position for the downlink data which is pre-agreed in a communication protocol;

wherein the one or more processors, when receiving the downlink data associated with the downlink data scheduling information broadcast by the base station, is configured to:

receive the downlink data at the resource scheduling position;

wherein the first indicator is a short message indicator, and a bit value of a bit field of the first indicator corresponds to a reserved entry of the short message indicator to inform the target terminal the presence of the downlink data scheduling information for the target terminal;

wherein the downlink control indication comprises an identification of the target terminal, or the downlink data comprises the identification of the target terminal.

12. The terminal of claim 11, wherein the one or more processors are further configured to:

determine that the information in the first indicator is configured to indicate the presence of the downlink data scheduling information for the target terminal in response to determining that the bit value of the bit field of the first indicator is a preset bit value.

13. The terminal of claim 11, wherein the one or more processors are further configured to:
    determine that the downlink data scheduling information is directed to the terminal in response to determining that the identification of the target terminal is consistent with a terminal identification of the terminal, wherein the identification of the target terminal is comprised in the downlink data or in the downlink control indication.

\* \* \* \* \*